United States Patent [19]

Lenack et al.

[11] 4,327,117

[45] Apr. 27, 1982

[54] THAW INDICATOR FOR FROZEN FOODS

[76] Inventors: Roger D. Lenack, 20357 Tuba St., Chatsworth, Calif. 91311; Isidore J. Lenack, deceased, late of Reseda, Calif., by Nellie S. Lenack, executrix

[21] Appl. No.: 131,530

[22] Filed: Mar. 18, 1980

[51] Int. Cl.³ ...................... A22C 17/10; G01K 11/06
[52] U.S. Cl. ...................................... 426/88; 116/207; 422/55; 426/383
[58] Field of Search ................. 116/207, 217; 426/88, 426/383

[56] References Cited

U.S. PATENT DOCUMENTS

| | | | |
|---|---|---|---|
| 2,261,473 | 4/1938 | Jennings | 116/207 X |
| 2,662,018 | 12/1953 | Smith | 116/217 |
| 2,716,065 | 8/1955 | Beckett et al. | 116/207 |
| 3,194,669 | 7/1965 | Koch | 73/356 X |
| 3,220,259 | 11/1965 | Beyer | 426/88 X |
| 3,786,777 | 1/1974 | Smith et al. | 116/207 X |
| 3,868,218 | 2/1975 | Tornmarck et al. | 426/88 X |
| 4,144,834 | 3/1979 | Donegan | 426/88 X |
| 4,145,918 | 3/1979 | Couch et al. | 426/88 X |

*Primary Examiner*—Daniel M. Yasich
*Attorney, Agent, or Firm*—Gene W. Arant; Thomas I. Rozsa

[57] ABSTRACT

An article of manufacture and a method or process adapted to indicate whether a product which has been kept at or below its freezing temperature has been permitted to thaw at some time subsequent to its initial freezing. The invention consists of two or more reagents being separated by an impermeable but removable or breakable barrier, said reagents being adapted to produce a chemical and/or physical change which is visually ascertainable once said barrier has either been removed or lost its integrity so that said reagents are thereafter permitted to intermix and/or interreact. Said reagents are situated within a translucent or transparent vessel in such a manner that after such reagents enter their solid states as the result of an appropriate reduction in temperature, said barrier loses its integrity as a reagent barrier only upon a subsequent and appropriate increase in the temperature about said article.

14 Claims, 11 Drawing Figures

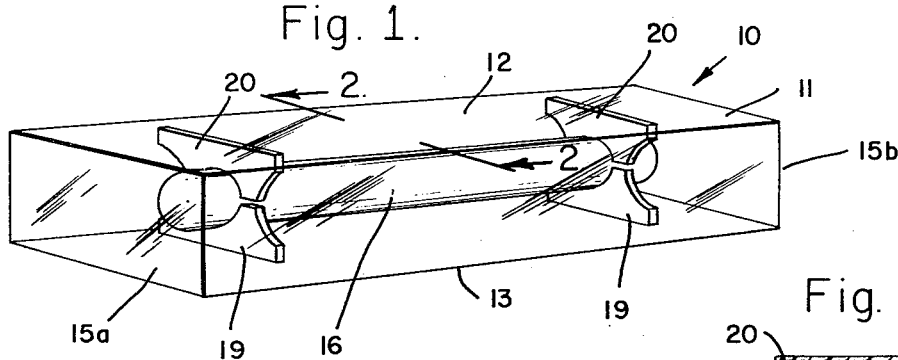
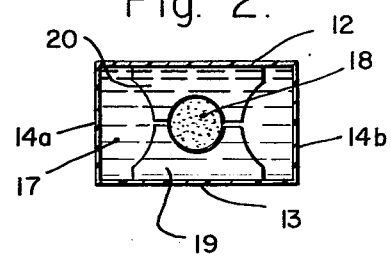
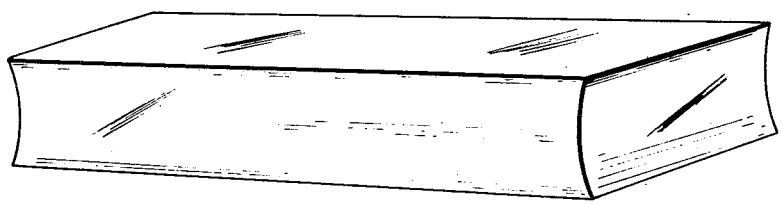
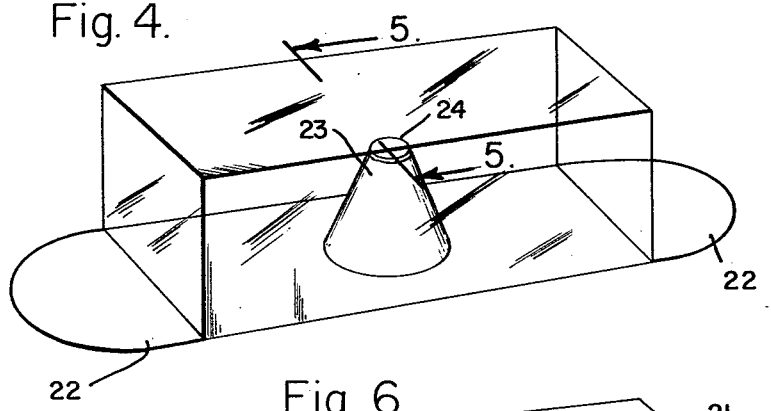
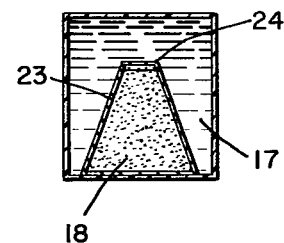
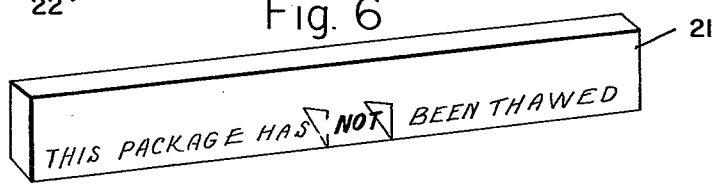
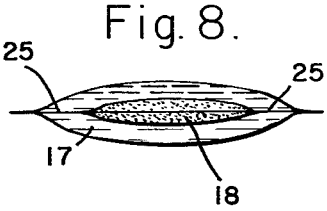

THAW INDICATOR FOR FROZEN FOODS

FIELD OF THE INVENTION

In the rapidly expanding frozen food industry of today, a common complaint against the processors and distributors of such foods is a lack of care sometimes exercised to prevent the premature thawing of such foods after their initial freezing, and the subsequent refreezing of same, all without the knowledge of the customer. Premature thawing and subsequent refreezing of such foods cannot ordinarily be discovered by the customer prior to their ingestion, and such refrozen foods are less appetizing and nutritious and generally may constitute a danger to the health of one consuming the food.

This invention relates to a thaw indicator for frozen products such as foods or biologicals by which one can readily ascertain whether products which have been frozen during their normal state have become thawed and unfrozen during any portion of time subsequent to their initial freezing. This invention is adapted to be used in conjunction with a frozen object to indicate to a potential user such as a food retailer and his customer as to whether the frozen object has become thawed subsequent to its initial freezing. Through use of the invention such previously thawed or exposed products, which may otherwise constitute a hazard to a person's health or safety, may be destroyed or otherwise discarded without the danger of ingesting or using them.

DESCRIPTION OF THE PRIOR ART

In order to properly maintain many products such as food or biological items, it is necessary for these products to be frozen with specific temperatures well below their freezing points. Subsequent to such freezing it is important to know whether these required temperatures have been maintained throughout the entire time subsequent to the initial freezing of the products. Such products undergo substantial changes in temperature subsequent to freezing, for example, during the process of transportation from the packing plant to shipping to the retailer and subsequently to the consumer's home. It is therefore necessary for the retailer and the customer to know whether such food has been subjected to a higher temperature and thawed subsequent to its initial freezing. In addition to food it is also necessary for various other biological items and materials to be maintained at a specific low temperature. It is therefore important for subsequent users of this material to know whether or not the biological or other item has been subjected to higher temperature and thawed subsequent to its initial freezing because such thawing may make the item unusable and possibly even dangerous for use. Once thawed, the subject frozen food, biological or other material could possibly be subject to spoilage or a dangerous chemical reaction within the subject material which would make it unusable for its intended purpose. Frozen food which has been allowed to thaw and thereafter been refrozen could subject the food to some undesirable chemical reaction which would destroy the taste of the food or possibly induce food poisoning in the consumer. Biologicals (including but not limited to drugs, and plasma) which have been thawed after initial freezing and subsequently frozen once again could possibly lose some of their healing properties and therefore become unusable for their intended purposes and possibly even be dangerous for the intended users of said biological products.

Attempts have previously been made to provide indicator devices in conjunction with various products which must be frozen and which are designed to indicate to a potential user whether or not thawing of this product has been occurred subsequent to its initial freezing. Two of the most common types of such a device are illustrated in U.S. Pat. Nos. 3,177,843 and 3,786,777. The frozen food indicator and the irreversible warm-up indicator devices illustrated in these patents is comprised of a package which is fixed to the frozen object. Contained within each package is a rupturable capsule containing a color fluid indicator which is adapted to be incorporated with the package of food which has been frozen and intended to be maintained in a frozen condition until sold. In U.S. Pat. No. 3,786,777 the central capsule consists of a frangible container which will fracture when liquid in it expands. When the food is frozen a colored liquid which is contained within the capsule freezes and expands rupturing said capsule at the time of the initial freezing. If the packaged food thaws prior to purchase, the colored liquid in the ruptured capsule will melt and stain an absorbent sheet which may or may not be impregnated with certain chemicals or contain grooves to facilitate the staining process. A drawback in the devices chosen in both of these patents is that the indicator possibly might not be entirely reliable. It is possible that stacked packaged products could bring sufficient weight to bear on the ruptured capsule to cause at least partial thawing of the colored fluid even though the temperature of the environment of the package might still be below the freezing point. Therefore, these devices run the risk of indicating a product has been thawed when in fact the product had not been thawed. In addition, a product which allows the barrier to break upon initial freezing may allow the two chemicals to intermix and interact over a period of time even though thawing has not in fact occurred.

In the prior art devices, the rupturing of the inner container occurs at the point of freezing and therefore allows the chemicals to intermix during the freezing state therefore potentially allowing the possibility that the color may change while the reactants are still in a frozen state due to the fact that some of the reactant may leak and stain the paper indicators shown in the prior art discussed previously. In the present invention, however, the rupturing of the surface of the inner vessel does not occur until the subject matter has been thawed so that the element in the outer vessel reenters its liquid state. Therefore there is no chance of premature staining and indicating that thawing has occurred when it has in fact not occurred because the rupture only occurs when the element has become thawed. Therefore this invention provides a substantial amount of safeguards over the prior art in assuring that the color change or other reaction will not occur unless in fact the item has thawed after the object has reached a certain temperature.

Various other attempts to indicate the freezing and subsequent thawing of a product are illustrated in the following U.S. Pat. Nos. 3,942,467 discloses a rupturable capsule containing one type of chemical solution and an outer transparent container containing a reactant compound which is mixed with the solution by pressure at a certain point so that the capsule is ruptured at the time the indicator is incorporated into the package. This mixture results in a distinctive color which is subject to change over a period of time or if the temperature rises beyond a certain point, or it may be a combination of the two. Such an indicator would appear to require quite precise proportioning of the chemicals in order to produce uniform and reliable results and it would also appear to be a very costly device to manufacture. U.S. Pat. No. 2,261,473 discloses the use of a temperature indicator which will change colors over a range of temperatures but which is reversible and cannot indicate that a frozen product has been thawed and refrozen. Finally U.S. Pat. No. 3,233,459 shows a temperature telltale wherein a wax barrier or partition melts during the rise in temperature permitting two previously separated liquids to commingle and produce a distinctive warning color. This device also provides an indicator for freezing temperatures. Two separated liquids expand when frozen, causing barriers between them to move in a given direction thereby releasing a screw which unseats a cap that enables a liquid to be released from a container. The absence of this liquid indicates that too low a temperature has been reached for the frozen product.

The prior art primarily indicates a device wherein a capsule contains a liquid which expands upon freezing, rupturing the capsule and subsequently allowing the liquid to melt upon reaching a higher temperature thereby staining a given surface and indicating a color change to show that thawing has occurred. Also shown in the prior art is a device consisting of a complex series of wax barriers and screws which do indicate that thawing has taken place after a complex series of actions have occurred. Finally the device of U.S. Pat. No. 2,261,473 will not indicate whether or not the product has been thawed during an intermediate process because its effectiveness is lost if the subject matter is subsequently refrozen. In each case all of these prior art devices require a rupturing of the capsule at the time the object is frozen and therefore do not incorporate the scientific principle of the present invention.

SUMMARY OF THE INVENTION

The invention relates in general to an article of manufacture and to a method or process by which one can readily ascertain whether products which have a desired holding or storage temperature have been exposed for any substantial period of time to any undesirable higher temperature. More particularly, the invention permits one to readily ascertain whether frozen products such as foods or biologicals have thawed subsequent to their initial freezing, or whether such foods or biologicals have been exposed for any substantial period of time to a temperature above the freezing temperature of any of its components. For example, the invention is adapted to cause certain specified reagents contained therein to intermix and/or interract upon a certain specified event, to wit: when such products have been exposed for any substantial period of time to any undesirable higher temperature. Such intermixing or interreaction will occur during or immediately after a rise in such temperature. Such change in the state of said reagents is readily observable. In practice, the invention will, among other things, effectively inform the food retailer or its customer whenever a frozen food having the invention attached thereto has thawed subsequent to its initial freezing, or whenever the same was exposed for any substantial period of time to a temperature above the freezing temperature of the reagents of the invention, either prior or subsequent to sale or uses thereof. The two reagents used will have freezing temperatures comparable to the freezing temperature of the frozen food or other subject matter they are indicating thaw temperatures on. As a result, such previously thawed products, which may otherwise constitute a hazard to a person's health or safety, may be destroyed or otherwise discarded without the danger of ingesting or using same.

The present invention obviates the above problem and easily and simply discloses if such products have thawed at any time subsequent to their initial freezing, or if the same have been exposed to a possibly detrimental high temperature during their transit or storage. In either event, such a disclosure by the invention is not reversible so that even if a prematurely thawed product is again frozen, or the ambient temperature about such an exposed product is thereafter reduced, an indication of said thaw or exposure continues to be readily observable.

It is, therefore, the primary purpose and objective of the present invention to have a device and a method or process by a preselected observable indication that the temperature has sufficiently risen about the container of frozen products, which container has the invention attached thereto or placed therein, so as to cause same to thaw or otherwise exceed the desired maximum holding temperature thereof.

The present invention has outer and inner reagents separated by a barrier, with the outer reagent being closer to the exterior surface of the invention than the inner reagent. In the present invention, upon an appropriate reduction of temperature causing initial freezing of said device, said outer reagent will enter into its solid state and increase in volume and pressure before said inner reagent enters into its solid state so as to prevent the fracturing, breaking, removal or loss of integrity of said barrier, when said inner reagent enters into its solid state and increases in volume and pressure. After both of said reagents are in their solid states, and upon an appropriate increase in temperature (i.e., thawing) about said device, said outer reagent will leave its solid state before said inner reagent leaves its solid state so as to thereby reduce the volumetric pressure of the outer reagent and cause said inner reagent to thereupon fracture, break or otherwise remove said barrier and permit said inner reagent to intermix and/or interreact with said outer reagent. This intermixture or interreaction produces a visible change in color or other characteristic.

The present invention may be easily attached to various products or containers therefor, and indicate whether such products have been exposed to a dangerously excessive temperature for any predetermined period of time.

Other and additional advantages of the present invention are to have a device which is compact and readily adaptable for use with all types of containers or products such as frozen foods; have a device which is economical to manufacture, easy to utilize, and have such other objectives, advantages and capabilities as will be readily apparent and better understood by referring to the following description and claims, taken in conjunction with the accompanying drawings, in which:

BRIEF DESCRIPTION OF THE DRAWINGS

FIG. 1 is a perspective view of the presently preferred form of the invention;

FIG. 2 is a cross-sectional view of the invention taken along line 2—2 of FIG. 1;

FIG. 3 is a perspective view of a modified embodiment of the invention shown in FIG. 1;

FIG. 4 is a perspective view of a third embodiment of the invention;

FIG. 5 is a cross-sectional view taken along line 5—5 of FIG. 4;

FIG. 6 is a perspective view of a fourth embodiment of the invention;

FIG. 7 is another perspective view of the embodiment shown in FIG. 6;

FIG. 8 is a cross-sectional view of a fifth embodiment of the invention;

DETAILED DESCRIPTION OF THE PREFERRED EMBODIMENT

Figure 11:
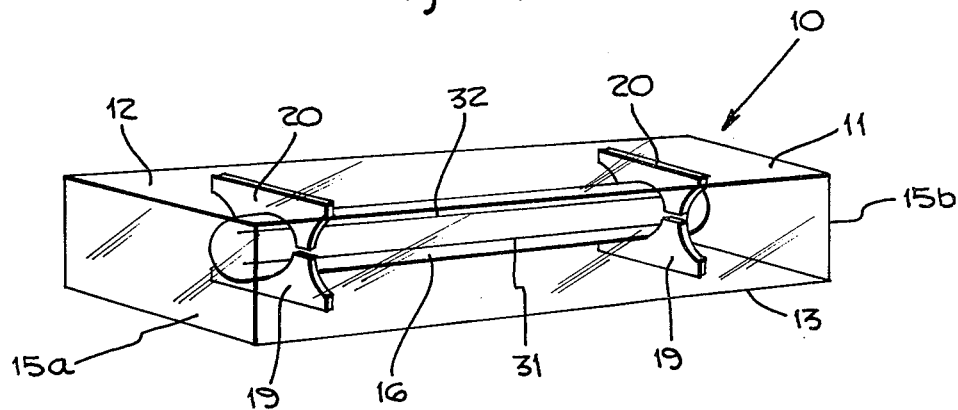
FIG. 11 is a perspective view of the presently preferred form of the invention as shown in FIG. 1 with scores or grooves in the inner hollow vessel.

With reference to the drawings of the invention in detail, and more particularly to FIGS. 1 and 2 thereof, the invention is shown generally as 10 and comprises a transparent, hollow, outer vessel 11 having top and bottom portions 12 and 13 respectively, side portions 14a and 14b, and end portions 15a and 15b. Said outer vessel 11 is adapted to receive wholly therein a smaller hollow, inner vessel 16. In addition said outer vessel 11 is adapted to contain between the interior surface area thereof and the exterior surface area of said inner vessel 16 an outer or first reagent 17 such as Phenol Red. The second or inner vessel 16 is adapted to contain therein a second or inner reagent 18 such as Sodium Carbonate. By way of example only, both of said reagents 17 and 18 are aqueous and adapted to be in their liquid states at room temperature. As may be appreciated, various other reagents (with or without solutes, aqueous and otherwise) may be utilized within said outer vessel 11 and inner vessel 16, all without departing from the spirit or scope of the present invention. Further, such other reagents may be adapted to be in their gaseous or solid states at room temperature, depending upon the desired usage thereof. In the preferred form of the invention 10 the surface areas or walls of said vessel 11 and 16 do not come in direct contact with each other. Various methods and means may be employed for retaining said inner vessel 16 within said outer vessel 11, as aforesaid. For an example, and as shown in FIGS. 1 and 2 of the drawing, a pair of substantially U-shaped support members 19 may be attached to the bottom portions 13 of said vessel 11 and a pair of substantially U-shaped support members 20 may be attached to the top portion 12 of said vessel 11. Said members, 19 and 20, are adapted to cooperate with each other so that they form a hollow structure adapted to receive and retain therebetween said inner vessel 16. The material for such support members, 19 and 20, should be relatively inert and non-reacting relative to said first reagent 17. However, other support means may be employed to retain said inner vessel 16 within said outer vessel 11, all without departing from the spirit and scope of the present invention. As may be appreciated, the inner vessel 16 is adapted to rest between and be supported by said support members 19 and 20. In any event, a closed receiving compartment is formed between the exterior surface of said inner vessel 16 and the sealed interior surface of said outer vessel 11. In such a manner the inner vessel 16 is suspended within the outer vessel 11, all without their respective surfaces coming in direct contact with each other.

Many other methods may be utilized for accomplishing the above result, all without department from the spirit or scope of the invention. For instance, the embodiment disclosed in FIG. 8 of the drawing avoids the use of support members 19 and 20, entirely, and permits the inner vessel 16 to merely "float" within the first reagent 17 of the outer vessel 11. However, filament means 25 shown in FIG. 8, may also be employed to cause said inner vessel 16 to remain substantially central within said outer vessel 11. Such an embodiment may easily be utilized without a substantial decrease in the efficiency of the invention 10 as related herein below.

Upon an appropriate reduction of temperature causing initial freezing of the invention 10, said outer reagent 17 will enter into its solid state and increase in volume and pressure before said inner reagent 18 enters into its solid state and increases in volume and pressure. The inner reagent 18 helps to resist the pressure of the outer reagent 17 once it has entered into its solid state. Since outer reagent 17 has already entered its solid state by the time inner reagent 18 enters its solid state, the outward pressure created by the solid state reagent 18 is resisted by the solid state reagent 17. Therefore the wall of the inner vessel 16 which provides a barrier between the two reagents does not fracture or lose its integrity while both reagents are in their respective solid states. The support members 19 and 20 permit said inner vessel 16 to remain in essentially the same position both prior and subsequent to freezing of the invention 10. After both of said reagents are in their solid states, and upon an appropriate increase in temperature (i.e., thawing) about said device, said outer reagent will leave its solid state first and return to its liquid state. Therefore, the volumetric pressure created by the outer reagent is reduced. Since said outer reagent 17 is now in its liquid state while said inner reagent 18 is still in its solid state, there is created a significant volumetric pressure differential. The outward pressure of still solid reagent 18 causes the wall of said inner vessel 16 to fracture, break or otherwise loose its integrity. At this instant in time, the barrier is removed but there is still no significant intermixing of said reagents. As inner reagent 18 leaves its solid state and returns to its liquid state, the inner reagent flows through the ruptured barrier and intermixes and/or interreacts with said outer reagent 17. This intermixture or interraction produces a visible change in color or other characteristics.

Upon freezing of the invention 10, said outer reagent 17 enters into its solid state. This causes said reagent to exert a significant outward volumetric pressure on the wall of said outer vessel 11. It is not desirable to cause a rupture of the surface of said outer vessel 11. Consequently another embodiment of the invention 10 is shown in FIG. 3. In this embodiment, the invention is identical to the embodiment shown in FIGS. 1 and 2. The only difference is that the side portions 14a and 14b and end portions 15a and 15b of outer vessel 11 are somewhat flexible and concave in their ordinary position. In this manner, the flexible and concave outer portions of outer vessel 11 are permitted to retain without breaking said reagent 17 when it freezes within said outer vessel 11 and exerts outward volumetric pressure on the outer portions 14a, 14b, 15a, 15b. It is not necessary however, for outer portions 14a, 14b, 15a and 15b to be flexible and concave as successful embodiments of the preferred invention have been used employing a medicine vial for the outer vessel 11 and a soda straw for the inner vessel 16.

A third embodiment of the invention 10 is shown in FIGS. 4 and 5. In this embodiment, the inner vessel 23 is in the shape of a cone. The apex of said cone 23 is truncated and has a removable cap 24 thereon. Upon freezing of the invention, said outer reagent 17 and said inner reagent 18 enter their respective solid states as previously discussed. When reagent 18 enters its solid state and exerts its volumetric pressure on the inner cone shaped vessel 23, greatest pressure is established at the area of said cap 24. Consequently when reagent 17 enters its liquid or gaseous state first upon an appropriate increase in temperature, the pressure from the still solid reagent 18 in said inner cone shaped vessel 23 pushes said cap 24 outwardly away from the rest of said cone shaped vessel 23. Upon reagent 18 entering its liquid or gaseous state, reagents 17 and 18 can intermix or interreact as previously discussed. As a result thereof, the desired visual effect as described above will occur.

If an embodiment of the invention has a barrier which must be fractured, ruptured or broken so as to permit the intermixing and/or interreaction of said reagents 17 and 18, then the material comprising said inner vessel 16 should be sufficiently fragile so as to permit such loss of integrity as a barrier when the first reagent 17 leaves its solid state during the increase in temperature. In order to ensure such loss of integrity at the appropriate time, it may be desirable to score, groove or otherwise create a point of weakness in said inner vessel 16 so as to facilitate such loss of integrity. FIG. 11 illustrates another embodiment of the invention 10. In this embodiment, the invention 10 is identical to the embodiment shown in FIGS. 1 and 2. The only difference is that the wall of the inner vessel 16 has several scores, grooves or points of weakness shown as 31 and 32 in FIG. 11. Consequently, when reagent 17 enters its liquid or gaseous state first upon an appropriate increase in temperature, the pressure from the still solid reagent 18 in said inner vessel 16 creates volumetric pressure as previously described. The wall of inner vessel 16 will first fracture, rupture or break at the points of the score or groove 31 and 32. Upon reagent 17 entering its liquid or gaseous state, reagents 17 and 18 can intermix or interreact as previously discussed. Other means may be employed without departing from the spirit and scope of the invention.

Referring to FIGS. 4, 6, 7, 9 and 10, the embodiments of the invention there shown are adapted to be attached to an appropriate container 21 as for frozen products by tabs 22, or placed within such a container 21 in such a manner that it can be seen from the outside of the container. With the invention 10 so attached to the package 21, it can be used to show if the contents of package 21 has subsequently thawed after its initial freezing. It is contemplated that the temperature about the container 21, including the product otherwise found therein, and the invention thaw indicator unit 10, is reduced in the usual manner until said product has reached its desired holding or storage temperature. Reducing the temperature about said container 21 and invention 10 may also be accomplished separately if so desired. In any event, said reagents, 17 and 18 are selected so that their freezing temperature and that of the packaged product are related so that upon a decrease in temperature, the freezing temperature of said reagents 17 and 18 will be achieved during the time that the temperature about such product is being reduced to the aforesaid desirable holding or storage temperature. As may be appreciated, it would be desirous to have particular sets of reagents for different types of products, all depending upon the desired holding or storage temperature of the product. Upon such circumstances, when said container 21 contains its desired holding or storage temperature, said reagents 17 and 18 will have entered their respective solid states.

Provided the freezing temperatures of the said reagents 17 and 18 are so related, as aforesaid, the outer reagent 17 in the outer vessel 11 will freeze before the inner reagent 18 in the inner vessel 16. Further it is known that the volume of an aqueous solution will increase as the temperature thereof decreases just before and after it enters its solid state. Consequently, when the reagent 17 in the outer vessel 11 freezes first and thus expands, said reagent 17 prevents the rupture of the inner vessel 16 when the second reagent 18 attempts to likewise expand as it approaches and reaches the solid state. However, since said second reagent 18 is thus prevented from expanding as aforesaid, pressure is established therein resulting in an approximate stress equilibrium in the wall of said inner vessel between said reagents 17 and 18. As may now be appreciated, upon said reagents 17 and 18, entering their solid states, said inner vessel 16 does not fracture, break or otherwise lose its integrity as a reagent barrier. Subsequently, when the ambient temperature about the package 21 and the invention 10 increases, the reagent 17 in the outer vessel 11 leaves its solid state before the reagent 18 in the inner vessel 16. Consequently the aforesaid pressure applied to the surface area of said inner vessel 16 may now be relieved. Under such circumstances, the remaining pressure of the reagent 18 in said inner vessel 16 is greater at said surface than the liquid or gaseous reagent 17 in the outer vessel 11 so that such pressure causes said surface to rupture, break or otherwise lose its integrity as a barrier between said reagents 17 and 18. As a result, said reagents 17 and 18, will tend to intermix and/or interreact even before said second reagent 18 fully enters its liquid state. In any event, when the reagent 18 in the inner vessel 16 enters its liquid or gaseous state, the intermixing or interreaction with the reagent 17 in the outer vessel 11, already in its liquid or gaseous state, will be complete and thus accomplish the desired change in composition.

If a solution of Phenol Red is utilized with a solution of Sodium Carbonate, the mixture thereof in their liquid states will result in a change of color of the new solution in the outer vessel 11 from yellow to red.

Figure 9:
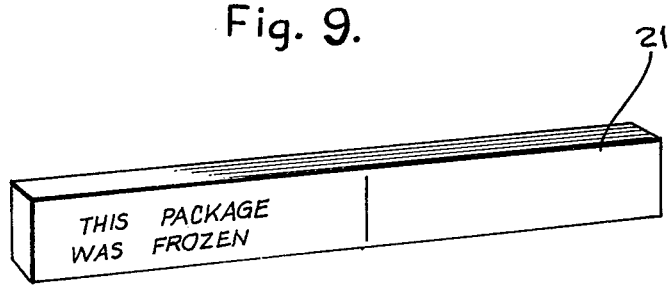
FIG. 9 is a perspective view of a sixth embodiment of the invention.
Figure 10:
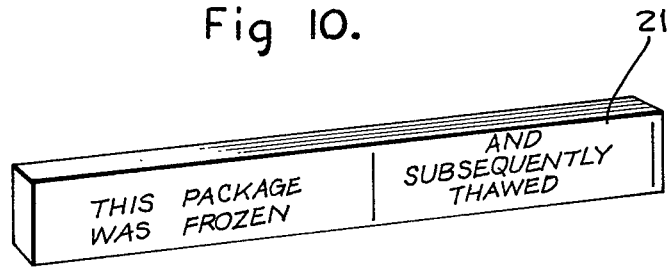
FIG. 10 is another perspective view of the embodiment shown in FIG. 9.

Regardless of the embodiment of the invention 10 so utilized, if other reagents are used therein, it is possible to either obscure or make clear a word or symbol otherwise found on the container 21. As previously mentioned and shown in FIGS. 4, 6, 7, 9 and 10, the invention 10 is attached to an appropriate container 21 as for frozen products by tabs 22, or placed within such a container 21 in such a manner that it can be seen from the outside of the container. If Aluminum Sulfate is placed within the outer vessel 11 and Barium Hydroxide is placed within the inner vessel 16, the mixing of same in their liquid state will result in the double precipitate of insoluable Barium Sulfate an Aluminum Hydroxide. As may be appreciated by viewing FIGS. 6 and 7 of the drawings, such a precipitate could be used to obscure one or more words or symbols in a printed statement spaced inwardly in the container 21 or under the invention 10. Thus the invention 10 may be used to change the meaning of a phrase such as the statement: "This package has NOT been thawed." As may be appreciated, the word "NOT" is normally visible through reagents 17 and 18. However, if thawing does in fact occur, the word "NOT" would be obscured by such a precipitate so that the statement would then appear to read "This package has — been thawed." As illustrated in FIGS. 9 and 10, the reverse may be accomplished so that a word or symbol previously obscured would become visible upon the intermixing and/or interreaction of said reagents 17 and 18. Thus the invention 10 may be used to change the meaning of a phrase such as the statement: "This Package Was Frozen". As may be appreciated, the balance of the phrase is normally obscured by reagents 17 and 18 when they are separate. However, if thawing does in fact occur, the balance of the phrase would become visible upon the intermixing and/or interreacting of reagents 17 and 18 so that the statement would then appear to read: "This Package Was Frozen And Subsequently Thawed."

It has been found that depending upon the shape of the inner vessel 16, the amount of the dissolved gaseous material in the solvents of the inner reagent 18 may affect the reliability of the facture, breakage or loss of integrity of the barrier of said inner vessel 16 when said reagents 17 and 18 leave their solid states as aforesaid. Consequently in the event said inner reagent 17 is aqueous in nature, it is recommended that said reagent 18 be boiled before its insertion within said inner vessel 16. In any event said inner vessel 16 should be entirely filled with said reagent 18 in its liquid state.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the methods shown are intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A thaw indicator for frozen products adapted to be attached to the product and to indicate whether a product which has been kept at or below its freezing temperature has been permitted to thaw at some time subsequent to its initial freezing, said thaw indicator comprising:
    an outer hollow vessel having a plurality of walls;
    an inner hollow vessel suspended by a plurality of spaced support retaining means and wholly received within said outer hollow vessel;
    an inner liquid reagent adapted to be initially contained within said inner hollow vessel;
    an outer liquid reagent adapted to be contained within the space between said two hollow vessels;
    said inner liquid reagent completely filling said inner hollow vessel so as to provide a uniform outward pressure force against the wall of said inner hollow vessel;
    said inner liquid reagent and said outer liquid reagent having freezing temperatures comparable to the freezing temperature of the product to which the thaw indicator is attached;
    said inner liquid reagent and said outer liquid reagent producing an irreversible chemical reaction when intermixed;
    said outer liquid reagent and said inner liquid reagent having their freezing temperatures so related to each other that:
    (a) during an initial decrease in ambient temperature which causes the product to be frozen and which further causes both reagents to enter their respective solid states, said outer liquid reagent reaches its freezing point and enters its solid state upon freezing and thereby increases it pressure before said inner reagent reaches its freezing point and enters its solid state upon freezing so that the wall of said inner hollow vessel does not rupture, fracture or otherwise lose its integrity as the barrier between said outer liquid reagent and said inner liquid reagent because the inward pressure from the initially frozen outer liquid reagent is resisted by the inner liquid reagent which completely fills said inner hollow vessel and the outward pressure from the subsequently frozen inner liquid reagent is resisted by the inward pressure from the previously frozen outer liquid reagent; and
    (b) upon an appropriate increase in temperature which causes the product to thaw, said outer liquid reagent will thaw first and enter its liquid state first because it is closer to the exterior of the thaw indicator, receives the increase in temperature first and effectively shields the inner liquid reagent, so that the resultant outward pressure from the still frozen inner liquid reagent and the resultant pressure differential then does cause said still frozen inner liquid reagent to rupture, break or otherwise destroy the integrity of said inner hollow vessel since the liquid filled outer vessel does not retain sufficient inward pressure as a liquid to resist the outward pressure, and subsequently said inner liquid reagent will thaw and enter its liquid state, and therefore both of said reagents will intermix and interract in an irreversible manner after said inner liquid reagent thaws and returns to its liquid state, said inner liquid reagent adapted to intermix or interract with said outer liquid reagent so as to visibly cause a change in the color or state of the mixture or solution then within said outer vessel;
therefore showing through at least one of said outer vessel walls if (b) has occurred that the frozen state has not been properly maintained but the frozen product has been permitted to thaw at some time subsequent to its initial freezing.

2. A thaw indicator as defined in claim 1 above, whereby the walls of the outer hollow vessel are flexible or concave in its ordinary position so as to enable said walls to retain without breaking said outer reagent when it freezes within said outer hollow vessel.

3. A thaw indicator as defined in claim 1 above, said support means being adapted to retain said inner vessel within said outer vessel without either of such vessels coming in direct contact with the other vessel.

4. A thaw indicator as defined in claim 1 above further comprising said support means being adapted to retain said inner hollow vessel within said outer hollow vessel without either of such vessels coming in direct contact with the other vessel.

5. A thaw indicator as defined in claim 1 above further comprising said support means being adapted to fasten said thaw indicator to or within the container for such frozen product so that without disturbing either the container or the frozen product contained therein an observer may visually determine whether such frozen product has been permitted to thaw at some time subsequent to its initial freezing.

6. A thaw indicator as defined in claim 1 above, whereby said inner hollow vessel has a score, groove or comparable mark to create a point of weakness at the site of the score or groove so that upon the ambient temperature about said thaw indicator being increased to cause said outer liquid reagent to enter its liquid state, said inner hollow vessel will rupture, fracture or otherwise achieve a loss of integrity as a reagent barrier at the site of the score, groove or other point of weakness.

7. A thaw indicator as defined in claim 1 above wherein said thaw indicator is placed on a product such that said outer hollow vessel is placed over a word or symbol which is visible on the product or container for the product and through the thaw indicator, whereby upon the intermixing or interreaction of said outer liquid reagent and said inner liquid reagent, one or more words, symbols or other such matter located under said outer hollow vessel of said thaw indicator become obscured.

8. A thaw indicator as defined in claim 1 above wherein said thaw indicator is placed on a product such that said outer hollow vessel is placed over a word or symbol which is visible on the product or container for the product but is obscured through the thaw indicator, whereby upon the intermixing or interreaction of said outer liquid reagent and said inner liquid reagent, one or more words, symbols or other such matter located under said outer hollow vessel of said thaw indicator become visible.

9. A thaw indicator for frozen products adapted to be attached to the product and to indicate whether a product which has been kept at or below its freezing temperature has been permitted to thaw at some time subsequent to its initial freezing, said thaw indicator comprising:
an outer hollow vessel;
an inner hollow vessel adapted to be wholly received within and spacedly supported by said outer hollow vessel;
said inner hollow vessel completely filled with the chemical reagent Sodium Carbonate;
the space between the two hollow vessels containing the chemical reagent Phenol Red;
said Sodium Carbonate completely filling said inner hollow vessel so as to provide a uniform outward pressure force against the wall of said inner hollow vessel;
said Phenol Red and said Sodium Carbonate having freezing temperatures comparable to the freezing temperature of the product to which the thaw indicator is attached;
said Phenol Red and said Sodium Carbonate producing an irreversible chemical reaction when intermixed;
said Phenol Red and said Sodium Carbonate having their freezing temperatures so related to each other that:
(a) during an initial decrease in ambient temperature which causes the product to be frozen and which further causes both the Phenol Red and the Sodium Carbonate to enter their respective solid states, the Phenol Red reaches its freezing point first and enters its solid state upon freezing and thereby increases its pressure before the Sodium Carbonate reaches its freezing point and enters its solid state upon freezing so that the wall of said inner hollow vessel does not rupture, fracture or otherwise lose its integrity as the barrier between the Phenol Red and the Sodium Carbonate because the inward pressure from the initially frozen Phenol Red is resisted by the Sodium Carbonate which completely fills said inner hollow vessel and the outward pressure from the subsequently frozen Sodium Carbonate is resisted by the inward pressure from the previously frozen Phenol Red; and
(b) upon an appropriate increase in temperature which causes the product to thaw, said Phenol Red will thaw first and enter its liquid state first because it is closer to the exterior of the thaw indicator, receives the increase in temperature first and effectively shields the Sodium Carbonate, so that the resultant outward pressure from the still frozen Sodium Carbonate and the resultant pressure differential then does cause said still frozen Sodium Carbonate to rupture, break or otherwise destroy the integrity of said inner hollow vessel since the liquid filled outer vessel does not retain sufficient inward pressure as a liquid to resist the outward pressure, and subsequently said Sodium Carbonate will thaw and enter its liquid state, and therefore said Phenol Red and said Sodium Carbonate will intermix and interreact in an irreversible manner after said Sodium Carbonate thaws and returns to its liquid state, said Phenol Red and said Sodium Carbonate intermixing and interreacting so that the color of the Phenol Red is changed from yellow to red; therefore visibly showing if (b) has occurred that the frozen state has not been properly maintained but the frozen product has been permitted to thaw at some time subsequent to its initial freezing.

10. A thaw indicator for frozen products adapted to be attached to the product and to indicate whether a product which has been kept at or below its freezing temperature has been permitted to thaw at some time subsequent to its initial freezing, said thaw indicator comprising:
an outer hollow vessel;
an inner hollow vessel adapted to be wholly received within and spacedly supported by said outer hollow vessel;
said inner hollow vessel completely filled with the chemical reagent Barium Hydroxide;
the space between the two hollow vessels containing the chemical reagent Aluminum Sulfate;
said Barium Hydroxide completely filling said inner hollow vessel so as to provide a uniform outward pressure force against the wall of said inner hollow vessel;

said Aluminum Sulfate and said Barium Hydroxide having freezing temperatures comparable to the freezing temperature of the product to which the thaw indicator is attached;

said Aluminum Sulfate and said Barium Hydroxide producing an irreversible chemical reaction when intermixed;

said Aluminum Sulfate and said Barium Hydroxide having their freezing temperatures so related to each other that:

(a) during an initial decrease in ambient temperature which causes the product to be frozen and which further causes both the Aluminum Sulfate and the Barium Hydroxide to enter their respective solid states, the Aluminum Sulfate reaches its freezing point first and enters its solid state upon freezing and thereby increases its pressure before the Barium Hydroxide reaches its freezing point and enters its solid state upon freezing so that the wall of said inner hollow vessel does not rupture, fracture or otherwise lose its integrity as the barrier between the Aluminum Sulfate and the Barium Hydroxide because the inward pressure from the initially frozen Aluminum Sulfate is resisted by the Barium Hydroxide which completely fills said inner hollow vessel and the outward pressure from the subsequently frozen Barium Hydroxide is resisted by the inward pressure from the previously frozen Aluminum Sulfate; and (b) upon an appropriate increase in temperature which causes the product to thaw, said Aluminum Sulfate will thaw first and enter its liquid state first because it is closer to the exterior of the thaw indicator, receives the increase in temperature first and effectively shields the Barium Hydroxide so that the resultant outward pressure from the still frozen Barium Hydroxide and the resultant pressure differential then does cause said still frozen Barium Hydroxide to rupture, break or otherwise destroy the integrity of said inner hollow vessel since the liquid filled outer vessel does not retain sufficient inward pressure as a liquid to resist the outward pressure, and subsequently said Barium Hydroxide will thaw and enter its liquid state, and therefore said Aluminum Sulfate and said Barium Hydroxide will intermix and interreact in an irreversible manner after said Barium Hydroxide thaws and returns to its liquid state, said Aluminum Sulfate and Barium Hydroxide intermixing and interreacting so as to form the double precipitate of insoluble Barium Sulfate and Aluminum Hydroxide;

therefore visibly showing if (b) has occurred that the frozen state has not been properly maintained but the frozen product has been permitted to thaw at some time subsequent to its initial freezing.

11. A thaw indicator for frozen products adapted to be attached to the product and to indicate whether a product which has been kept at or below its freezing temperature has been permitted to thaw at some time subsequent to its initial freezing, said thaw indicator comprising:

an outer hollow vessel;

an inner hollow vessel which has a cap removably attached thereto, said inner hollow vessel being adapted to be wholly received within said outer hollow vessel;

a connection between said outer hollow vessel and said inner hollow vessel so that said cap forms a removable partition therebetween;

an inner liquid reagent adapted to be initially contained within said inner hollow vessel;

an outer liquid reagent adapted to be contained within the space between said two hollow vessels;

said inner liquid reagent completely filling said inner hollow vessel so as to provide a uniform outward pressure force against the wall and the cap of said inner hollow vessel;

said inner liquid reagent and said outer liquid reagent having freezing temperatures comparable to the freezing temperature of the product to which the thaw indicator is attached;

said inner liquid reagent and said outer liquid reagent producing an irreversible chemical reaction when intermixed;

said outer liquid reagent and said inner liquid reagent having their freezing temperatures so related to each other that:

(a) during an initial decrease in ambient temperature which causes the product to be frozen and which further causes both reagents to enter their respective solid states, said outer liquid reagent reaches its freezing point and enters its solid state upon freezing and thereby increases its pressure before said inner reagent reaches its freezing point and enters its solid state upon freezing so that the cap and wall of said inner hollow vessel does not rupture, fracture or otherwise lose its integrity as the barrier between said outer liquid reagent and said inner liquid reagent because the inward pressure from the initially frozen outer liquid reagent is resisted by the inner liquid reagent which completely fills said inner hollow vessel and the outward pressure from the subsequently frozen inner liquid reagent is resisted by the inward pressure from the previously frozen outer liquid reagent; and (b) upon an appropriate increase in temperature which causes the product to thaw, said outer liquid reagent will thaw first and enter its liquid state first because it is closer to the exterior of the thaw indicator, receives the increase in temperature first and effectively shields the inner liquid reagent, so that the resultant outward pressure from the still frozen inner liquid reagent and the resultant pressure differential then does cause said still frozen inner liquid reagent to push the cap outwardly and into said outer vessel since the liquid filled outer vessel does not retain sufficient inward pressure as a liquid to resist the outward pressure, and subsequently said inner liquid reagent will thaw and enter its liquid state, and therefore both of said reagents will intermix and interreact in an irreversible manner after said inner liquid reagent thaws and returns to its liquid state, said inner liquid reagent adapted to intermix or interreact with said outer liquid reagent so as to visibly cause a change in the color or state of the mixture or solution then within the outer vessel;

therefore showing if (b) has occurred that the frozen state has not been properly maintained but the frozen product has been permitted to thaw at some time subsequent to its initial freezing.

12. A method or process for frozen products adapted to indicate whether a product which has been kept at or below its freezing temperature has been permitted to thaw at some time subsequent to its initial freezing, which method comprises:

placing an outer liquid reagent in an outer hollow vessel;

placing an inner liquid reagent in an inner hollow vessel adapted to be wholly received and spacedly supported within said outer hollow vessel containing said outer liquid reagent so that said inner hollow vessel is completely filled with said inner liquid reagent;

said inner liquid reagent and said outer liquid reagent having freezing temperatures comparable to the freezing temperature of the product to which the thaw indicator is attached;

said inner liquid reagent and said outer liquid reagent producing an irreversible chemical reaction when intermixed;

said outer liquid reagent and said inner liquid reagent having their freezing temperatures so related to each other that:

(a) during an initial decrease in ambient temperature which causes the product to be frozen and which further causes both reagents to enter their respective solid states, said outer liquid reagent reaches its freezing point and enters its solid state upon freezing and thereby increases its pressure before said inner reagent reaches its freezing point and enters its solid state upon freezing so that the wall of said inner hollow vessel does not rupture, fracture or otherwise lose its integrity as the barrier between outer liquid reagent and said inner liquid reagent because the inward pressure from the initially frozen outer liquid reagent is resisted by the inner liquid reagent which completely fills said inner hollow vessel and the outward pressure from the subsequently frozen inner liquid reagent is resisted by the inward pressure from the previously frozen outer liquid reagent; and (b) upon an appropriate increase in temperature which causes the product to thaw, said outer liquid reagent will thaw first and enter its liquid state first because it is closer to the exterior of the thaw indicator, receives the increase in temperature first and effectively shields the inner liquid reagent, so that the resultant outward pressure from the still frozen inner liquid reagent and the resultant pressure differential then does cause said still frozen inner liquid reagent to rupture, break or otherwise destroy the integrity of said inner hollow vessel since the liquid filled outer vessel does not retain sufficient inward pressure as a liquid to resist the outward pressure, and subsequently said inner liquid reagent will thaw and enter its liquid state, and therefore both of said reagents will intermix and interreact in an irreversible manner after said inner liquid reagent thaws and returns to its liquid state, said inner liquid reagent adapted to intermix or interreact with said outer liquid reagent so as to visibly cause a change in the color or state of the mixture or solution then within said outer vessel;

therefore showing if (b) has occurred that the frozen state has not been properly maintained but the frozen product has been permitted to that at some time subsequent to its initial freezing.

13. The method as defined in claim 12, wherein said outer liquid reagent is Phenol Red, said inner liquid reagent is Sodium Carbonate, and upon intermixing or interreaction of the Phenol Red and the Sodium Carbonate, the Phenol Red changes color from yellow to red.

14. The method as defined in claim 12 wherein said outer liquid reagent is Aluminum Sulfate, said inner liquid reagent is Barium Hydroxide, and upon intermixing or interreaction of the Aluminum Sulfate and the Barium Hydroxide, the reagents form the double precipitate of insoluble Barium Sulfate and Aluminum Hydroxide.

* * * * *